(12) United States Patent
Lee

(10) Patent No.: US 8,345,750 B2
(45) Date of Patent: Jan. 1, 2013

(54) SCENE CHANGE DETECTION

(75) Inventor: Hung-Ju Lee, Pleasanton, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 661 days.

(21) Appl. No.: 12/553,069

(22) Filed: Sep. 2, 2009

(65) Prior Publication Data

US 2011/0051809 A1    Mar. 3, 2011

(51) Int. Cl.
  H04B 1/66    (2006.01)
  H04N 7/12    (2006.01)
  H04N 11/02   (2006.01)
  H04N 11/04   (2006.01)

(52) U.S. Cl. .................................. 375/240.08

(58) Field of Classification Search .................. None
See application file for complete search history.

(56) References Cited

U.S. PATENT DOCUMENTS

| | | | | |
|---|---|---|---|---|
| 5,404,174 A * | 4/1995 | Sugahara | ........................ | 348/700 |
| 5,724,100 A * | 3/1998 | Kuchibhotla | ............. | 375/240.24 |
| 5,731,835 A * | 3/1998 | Kuchibholta | ............. | 348/390.1 |
| 5,751,378 A * | 5/1998 | Chen et al. | ..................... | 348/700 |
| 6,411,771 B1 * | 6/2002 | Aotake | ........................ | 386/282 |
| 6,618,507 B1 * | 9/2003 | Divakaran et al. | ............ | 382/236 |
| 7,292,690 B2 | 11/2007 | Candelore et al. | | |
| 7,453,941 B1 * | 11/2008 | Yamori et al. | ............ | 375/240.15 |
| 2003/0123726 A1 * | 7/2003 | Suh | ................. | 382/170 |
| 2003/0185442 A1 * | 10/2003 | Yang et al. | ..................... | 382/172 |
| 2004/0264788 A1 | 12/2004 | Bazin et al. | | |
| 2005/0089232 A1 * | 4/2005 | Hsu et al. | ....................... | 382/236 |
| 2005/0122427 A1 * | 6/2005 | Hougui et al. | ................ | 348/453 |
| 2007/0286579 A1 * | 12/2007 | Murabayashi et al. | ......... | 386/96 |
| 2007/0291942 A1 * | 12/2007 | Candelore et al. | ............. | 380/216 |
| 2008/0095512 A1 * | 4/2008 | Murabayashi et al. | ......... | 386/54 |
| 2008/0138043 A1 * | 6/2008 | Murabayashi et al. | ........ | 386/124 |
| 2009/0268097 A1 * | 10/2009 | Lin et al. | ........................ | 348/700 |
| 2010/0054340 A1 * | 3/2010 | Reibman | .................. | 375/240.25 |
| 2010/0119210 A1 * | 5/2010 | Kusunoki | ........................ | 386/95 |

FOREIGN PATENT DOCUMENTS

EP    1924098 A1    5/2008

OTHER PUBLICATIONS

PCT International Search Report for International Application No. PCT/US2010/047178 mailed on Oct. 25, 2010.

* cited by examiner

*Primary Examiner* — Ayaz Sheikh
*Assistant Examiner* — Peter Chau
(74) *Attorney, Agent, or Firm* — Joshua D. Isenberg; JDI Patent

(57) ABSTRACT

Scene change detection in encoding digital pictures is disclosed. A statistical quantity $\mu_M$ is calculated for a given section in a current picture. A window of one or more sections is defined around a co-located section in a previous picture. A statistical sum E is calculated over the sections in the window. A difference between the statistical sum E and the statistical quantity $\mu_M$ is calculated. The difference between E and $\mu_M$ is used to determine whether the given section is a scene-change section. Whether the current picture is a scene-change picture may be determined from the number of scene change sections. Information indicating whether or not the current picture is a scene-change picture may be stored or transferred.

18 Claims, 5 Drawing Sheets

SCENE CHANGE DETECTION

CROSS REFERENCE TO RELATED APPLICATIONS

This application is related to commonly-assigned co-pending U.S. patent application Ser. No. 12/553,070, which is filed the same day as the present application and entitled "PICTURE-LEVEL RATE CONTROL FOR VIDEO ENCODING", the entire contents of which are incorporated herein by reference.

This application is related to commonly-assigned co-pending U.S. patent application Ser. No. 12/553,073, which is filed the same day as the present application and entitled "PARALLEL DIGITAL PICTURE ENCODING", the entire contents of which are incorporated herein by reference.

This application is related to commonly-assigned co-pending U.S. patent application Ser. No. 12/553,075, which is filed the same day as the present application and entitled "UTILIZING THRESHOLDS AND EARLY TERMINATION TO ACHIEVE FAST MOTION ESTIMATION IN A VIDEO ENCODER", the entire contents of which are incorporated herein by reference.

FIELD OF THE INVENTION

Embodiments of the invention are related to digitally encoding video images and more particularly to scene change detection in encoding of video images.

BACKGROUND OF THE INVENTION

Digital signal compression is widely used in many multimedia applications and devices. Digital signal compression using a coder/decoder (codec) allows streaming media, such as audio or video signals to be transmitted over the Internet or stored on compact discs. A number of different standards of digital video compression have emerged, including H.261, H.263; DV; MPEG-1, MPEG-2, MPEG-4, VC1; and AVC (H.264). These standards, as well as other video compression technologies, seek to efficiently represent a video frame picture by eliminating the spatial and temporal redundancies in the picture and among successive pictures. Through the use of such compression standards, video contents can be carried in highly compressed video bit streams, and thus efficiently stored in disks or transmitted over networks.

MPEG-4 AVC (Advanced Video Coding), also known as H.264, is a video compression standard that offers significantly greater compression than its predecessors. The H.264 standard is expected to offer up to twice the compression of the earlier MPEG-2 standard. The H.264 standard is also expected to offer improvements in perceptual quality. As a result, more and more video content is being delivered in the form of AVC(H.264)-coded streams. Two rival DVD formats, the HD-DVD format and the Blu-Ray Disc format support H.264/AVC High Profile decoding as a mandatory player feature. AVC(H.264) coding is described in detail in "Draft of Version 4 of H.264/AVC (ITU-T Recommendation H.264 and ISO/IEC 14496-10 (MPEG-4 part 10) Advanced Video Coding)" by Gary Sullivan, Thomas Wiegand and Ajay Luthra, Joint Video Team (JVT) of ISO/IEC MPEG & ITU-T VCEG (ISO/IEC JTC1/SC29/WG11 and ITU-T SG16 Q.6), 14th Meeting: Hong Kong, CH 18-21 January, 2005, the entire contents of which are incorporated herein by reference for all purposes.

Modern video coder/decoders (codecs), such as MPEG2, MPEG4 and H.264 generally divide video frames into three basic types known as Intra-Frames, Predictive Frames and Bipredicitve Frames, which are typically referred to as I-frames, P-frames and B-frames respectively.

An I-frame is a picture coded without reference to any picture except itself. I-frames are used for random access and are used as references for the decoding of other P-frames or B-frames. I-frames may be generated by an encoder to create random access points (to allow a decoder to start decoding properly from scratch at a given picture location). I-frames may be generated when differentiating image details prohibit generation of effective P or B frames. Because an I-frame contains a complete picture, I-frames typically require more bits to encode than P-frames or B-frames.

P-frames require the prior decoding of some other picture(s) in order to be decoded. P-frames typically require fewer bits for encoding than I-frames. A P-frame contains encoded information regarding differences relative to a previous I-frame in decoding order. A P-frame typically references the preceding I-frame in a Group of Pictures (GoP). P-frames may contain both image data and motion vector displacements and combinations of the two. In some standard codecs (such as MPEG-2), P-frames use only one previously-decoded picture as a reference during decoding, and require that picture to also precede the P-frame in display order. In H.264, P-frames can use multiple previously-decoded pictures as references during decoding, and can have any arbitrary display-order relationship relative to the picture(s) used for its prediction.

B-frames require the prior decoding of either an I-frame or a P-frame in order to be decoded. Like P-frames, B-frames may contain both image data and motion vector displacements and/or combinations of the two. B-frames may include some prediction modes that form a prediction of a motion region (e.g., a segment of a frame such as a macroblock or a smaller area) by averaging the predictions obtained using two different previously-decoded reference regions. In some codecs (such as MPEG-2), B-frames are never used as references for the prediction of other pictures. As a result, a lower quality encoding (resulting in the use of fewer bits than would otherwise be used) can be used for such B pictures because the loss of detail will not harm the prediction quality for subsequent pictures. In other codecs, such as H.264, B-frames may or may not be used as references for the decoding of other pictures (at the discretion of the encoder). Some codecs (such as MPEG-2), use exactly two previously-decoded pictures as references during decoding, and require one of those pictures to precede the B-frame picture in display order and the other one to follow it. In other codecs, such as H.264, a B-frame can use one, two, or more than two previously-decoded pictures as references during decoding, and can have any arbitrary display-order relationship relative to the picture(s) used for its prediction. B-frames typically require fewer bits for encoding than either I-frames or P-frames.

As used herein, the terms I-frame, B-frame and P-frame may be applied to any streaming data units that have similar properties to I-frames, B-frames and P-frames, e.g., as described above with respect to the context of streaming video.

Video encoding often takes advantage of the fact that within a given video scene certain elements of the visual content of the scene tend to remain relatively static. It is therefore possible to reduce compress the data needed to encode a video signal by coding a given picture in terms of differences between the picture and a previous picture that is used as a reference. However, if a video sequence contains a scene change there might not be a previous picture that is usable as a reference. It is therefore useful for an encoding program to be able to detect a scene change since the change of scene can have an affect on the encoding process. Previous scene change detection algorithms have been based on analysis of the content of video frames.

It is within this context that embodiments of the invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Figure 1A:
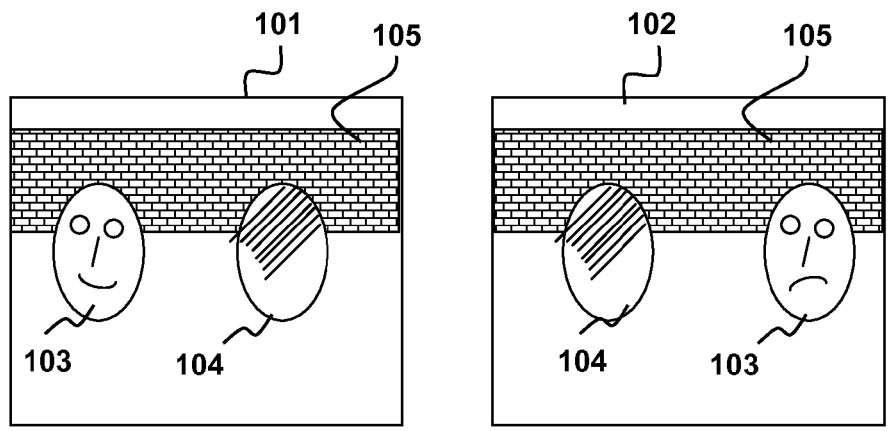
FIG. 1A is a schematic diagram illustrating a scene change between two video frames.

The nature of the problem of scene change detection may be appreciated by referring to FIG. 1A, which depicts first and second video frames 101, 102 respectively. The frames 101, 102 are successive frames in a video sequence. The first frame 101 shows a view of two characters 103, 104 taken from a particular angle against a particular background 105. The second frame 102 shows the same two characters 103, 104, and the relative positions of the characters 103, 104 has changed between the first frame 101 and the second frame 102. Furthermore, in the first frame 101, one of the characters 103 is smiling and in the second frame 102 this character 103 is frowning.

From a content point of view (the approach taken by the prior art) the difference between the first frame 101 and the second frame 102 may be interpreted as a scene change. However, from a coding point of view, this is not a scene change since the elements of the scene (i.e., the characters 103, 104 and background 105 in this example) are substantially the same. Thus, the first frame 101 could be used as a reference for the second frame 102 as long as the distance between these is within the underlying motion search range. Unfortunately, prior art video coding schemes that use content-based scene change detection would not recognize this and would code the second frame 102 as an independent frame (I-frame). This would cause inefficiency in the coding of the frames 101, 102.

To overcome this problem, embodiments of the present invention may implement a video scene change detection algorithm. The algorithm proposed herein may effectively locate scene cuts in a video sequence so that the following video processing module (e.g., video compressor/encoder) can utilize this useful information. A typical application in the domain of video encoding application is to determine picture frame type. For example, a picture frame with a scene cut will be labeled as I picture frame, where a MPEG video encoder is able to independently encode this frame without referencing past picture frames.

The scene change detection algorithm described herein may be differentiated from other scene change algorithms in a number of as aspects. In particular, the proposed algorithm may be conceptually coupled with video encoding, but not necessarily implementedly coupled to video encoding. That is, the algorithm need not be part of a video encoding program even though many existing scene change algorithms are embedded in motion estimation module. This algorithm may be separate from a video encoding engine and may be viewed as a form of pre-processing of a video sequence to be encoded.

With the proposed algorithm, the determination as to whether or not a picture frame is a scene change is based on coding efficiency in addition to picture content. For example, a picture frame shows different small foreground object with very similar large background object from its neighboring frame. From a content point of view, the picture frame might be labeled as a scene change frame. However, from a coding efficiency point of view, a large portion of the picture frame (e.g., the background object) is redundant and similar to that in the preceding frame. This redundant information may be extracted and removed by an underlying motion estimation/compensation module.

The proposed algorithm is a macroblock-based approach, which matches with the coding granularity in typical MPEG-based video encoders. The proposed algorithm also utilizes window filtering with weighting factors to determine the degree of difference of a macroblock in a current picture with co-located and neighboring macroblocks of a previous picture. With window-based weighting filtering statistical differences may be computed and collected for the final decision.

Figure 1B:
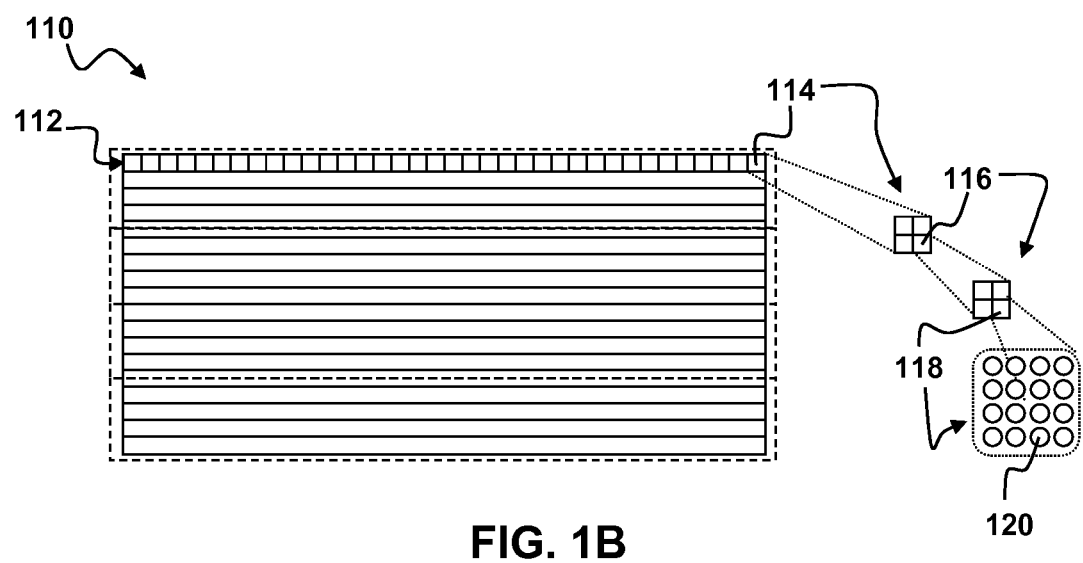
FIG. 1B is a schematic diagram illustrating one possible division of a video picture for encoding.

A video picture may be broken down in suitable sized units for coding and decoding. For example, as shown in FIG. 1B, a single picture 110 may be broken down into one or more sections. As used herein, the term "section" refers to group of one or more pixels within a picture. A section can range from a single pixel within the picture, up to the whole picture. Non-limiting examples of sections include slices 112, macroblocks 114, sub-macroblocks 116, blocks 118 and individual pixels 120. As illustrated in FIG. 1B, each slice 112 contains one or more rows of macroblocks 114. The number of macroblocks in a row depends on the size of the macroblocks and the size and resolution of the picture 110. For example, if each macroblock contains sixteen by sixteen pixels then the number of macroblocks in each row may be determined by dividing the width of the picture 110 (in pixels) by sixteen. Each macroblock 114 may be broken down into a number of sub-macroblocks 116. Each sub-macroblock 116 may be broken down into a number of blocks 118 and each block may contain a number of pixels 120. By way of example, and without limitation of the invention, in a common video coding scheme, each 16×16 pixel macroblock 114 may be broken down into four 8×8 pixel sub-macroblocks 116. Each sub-macroblock may be broken down into four blocks 118 and each block may contain a four pixel by four pixel arrangement containing sixteen pixels 120.

Algorithm Description

Figure 2A:
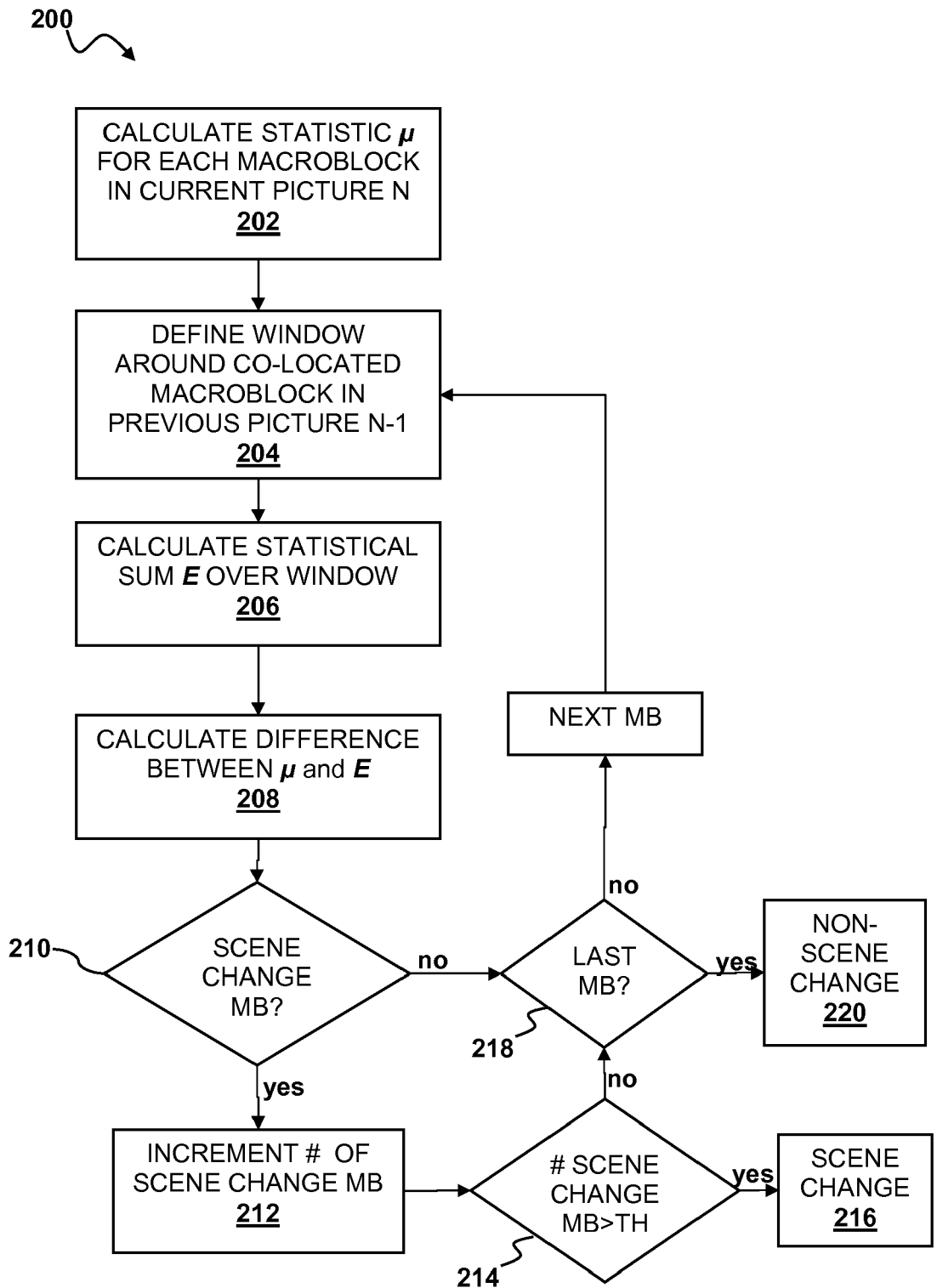
FIG. 2A is a flow diagram illustrating an example of a scene change detection algorithm according to an embodiment of the present invention.

An example of a scene change detection algorithm 200 is shown in FIG. 2A. As noted above, each picture in a video stream may be broken up into multiple sections. In embodiments of the present invention, scene change determination is based on a section-by-section analysis of the current picture with respect to a previous picture. For the purposes of example and not limitation, the analysis is described as being done on a macroblock-by-macroblock basis. Those skilled in the art will recognize that the algorithm may be generalized to other section sizes.

As indicated at 202, a statistical quantity $\mu_M$ may be computed for each macroblock in the current picture N, to characterize each macroblock. Examples of useful statistical quantities include a mean pixel value (e.g., chrominance or luminance) for the macroblock or a variance of such a value. The value the statistical quantity $\mu_M$ for each macroblock may be stored in a memory on a macroblock-by-macroblock basis.

Figure 2B:
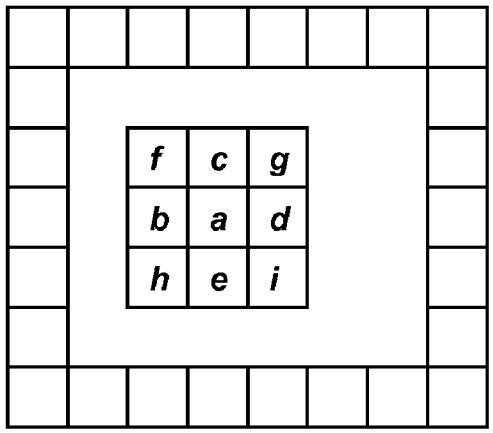
FIGS. 2B-2C are block diagrams illustrating macroblocks based scene change detection algorithm according to an embodiment of the present invention.
Figure 2C:
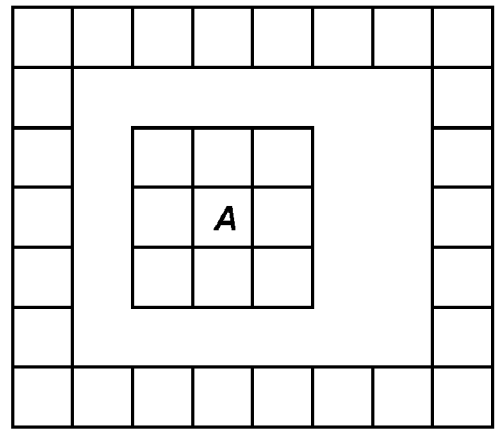

As depicted in FIGS. 2B-2C, the current video picture N may be divided macroblock by macroblock in the same manner as a preceding picture N−1. The algorithm 200 uses the preceding frame to decide if the current frame N is a scene change frame based on an analysis of the macroblocks in the previous picture N−1 and the current picture N. Specifically, values of the statistical quantity $\mu_m$ may be calculated for each macroblock in the preceding frame N−1 and stored in a computer memory for scene-change determination as discussed below.

Figure 3A:
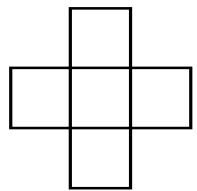
FIGS. 3A-3C shows three different windowing shapes for weighting filtering window.
Figure 3B:
Figure 3C:

A window may be defined around a co-located macroblock in the previous picture N−1, as indicated at 204. By way of example, and not by way of limitation, for a macroblock A in the current picture N, a co-located macroblock a may be found in the previous frame N−1, and all of the eight macroblocks (from b to i) neighboring macroblock a are also located to form a weighting filtering window. As used herein, macroblocks A and a may be said to be co-located if they are in different pictures but at corresponding locations within those pictures. By way of example, macroblock A may be the $j^{th}$ macroblock in the $k^{th}$ row of macroblocks in the current picture and co-located macroblock a may be the $j^{th}$ macroblock in the $k^{th}$ row of the preceding macroblock N−1. Note that one can choose a different shape of window as long as it makes technical sense for the purpose of scene-change detection. For example, FIGS. 3A-3C depict three possible alternative windowing shapes that may be used for the filtering window in embodiments of the present invention.

Once a filtering window is selected around the co-located macroblock in the previous picture, a statistical sum E may be calculated based on the statistical quantity values for each of the macroblocks in the window, as indicated at 206. By way of example, and not by way of limitation, the statistical sum E may be a weighted sum of the statistical quantity $\mu_m$ taken over the window. In some embodiments, a weighting factor may be assigned to each of the macroblocks in the window to capture a degree of relevance of each macroblock to the center macroblocks (e.g., A and a). By way of example, if macroblocks A and a are sufficiently similar statistically, all of the other neighboring macroblocks in the window may be assigned equal weighting factors. If A and a are not sufficiently similar statistically, an associated moving direction M may be derived. Based on the detected moving direction M, macroblocks within the window that lie along the moving direction M may be assigned greater weight than those macroblocks that do not lie along the moving direction M.

Figure 4A:
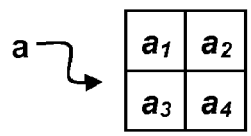
FIGS. 4A-4B shows the macroblocks each consisting of four 8×8 blocks.
Figure 4B:
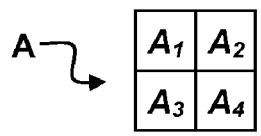

There are a number of ways in which the moving direction M may be derived. By way of example, and not by way of limitation, a simple 8×8 block of pixels (one macroblock typically comprises four 8×8 blocks) based directional determination can be used to estimate the moving direction as shown in FIGS. 4A-4B. From the biggest block difference can lead to the moving direction as shown in FIGS. 5A-5B.

The moving direction may be derived in any suitable fashion. By way of example, and not by way of limitation, the moving direction may be parallel to a line between the most statistically different blocks between macroblock a in previous picture N−1 and macroblock A in current picture N.

Figure 5A:
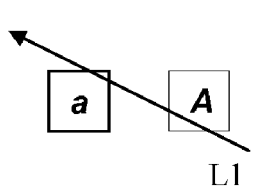
FIGS. 5A-5B shows the macroblocks with the moving directions.
Figure 5B:
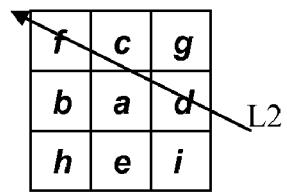

In the example depicted in FIGS. 5A-5B, the macroblocks f, c and d, which lie along the moving direction M may be assigned more weight than macroblock g, b, i, e, and h, which do not. The sum of the weighting factors may be set to a constant value of 1 for normalization. That is, $$\sum_{m=a}^{i} W_m = 1.0.$$

where $W_m$ is a weight factor for a given macroblock m, m={a,b,c,d,e,f,g,h,i}, and $0.0 \leq W_m \leq 1.0$.

After the weighting factors are assigned, a total weighted sum may be calculated. For example, assuming that the mean pixel value of a macroblock is used (other statistical data can be used, as well) and denoted as $\mu_m$, the total weighted sum E may be given by:

$$E = \sum_{m=a}^{i} (W_m \times \mu_m).$$

Once the weighted sum E has been calculated the value difference between the mean value $\mu_A$ of macroblock A and the weighted sum E may then be computed as indicated at 208. If the difference is above a pre-defined threshold (TH), macroblock A may be counted as a scene-change macroblock, otherwise it is a non-scene-change macroblock. Note that the threshold TH may be updated for each picture based on the contents of the picture.

After a determination has been made as to whether each macroblock in the current picture N is a scene-change or non-scene-change macroblock the number of scene-change macroblocks in the current picture N may be counted. It is then possible to determine if the picture frame is of scene change based on the number of scene-change macroblocks. By way of example, and not by way of limitation, the algorithm may base this decision on whether the number of scene changes macroblocks is a majority of the macroblocks in the current picture N or larger than a pre-defined threshold for the picture. In the example depicted in FIG. 2A a running tally of the number of scene-change macroblocks is kept by incrementing a count of scene change macroblocks. For example, if it is determined at 210 that a macroblock is a scene-change macroblock the count is incremented, as indicated at 212. If the tally exceeds the threshold at 214 the picture may be deemed a scene change picture at 216 and further scene-change macroblock calculations may be obviated. If the macroblock is found to be a non-scene-change macroblock at 210 then, if the macroblock is the last macroblock at 218 and the tally is still below the threshold at 214 the current picture N may be determined to be a non-scene change picture at 220. Otherwise, the process repeats for the next macroblock in the current picture. Once the process has been repeated for each macroblock in the current picture, the process may repeat for a subsequent picture N+1. It is noted that the values of $\mu_M$ computed for each macroblock in the current picture N, may be stored for use in calculating the statistical sum E for picture N, which is the preceding picture to picture N+1.

Otherwise, the process repeats for the next macroblock in the current picture. Once the process has been repeated for each macroblock in the current picture, the process may repeat for a subsequent picture N+1. It is noted that the values of $\mu_M$ computed for each macroblock in the current picture N, may be stored for use in calculating the statistical sum E for picture N, which is the preceding picture to picture N+1.

Once a determination has been made as to whether the current picture is a scene change picture, the current picture may be encoded, e.g., using a software encoder. The algorithm 200 may store or transfer information indicating whether or not the current picture contains a scene change. The encoder may use this information in encoding the current picture. For example, if the information indicates that the current picture is a scene change picture the encoder may encode the current picture as an I-frame. Otherwise, the encoder may encode the picture as a P-frame or B-frame.

Figure 6:
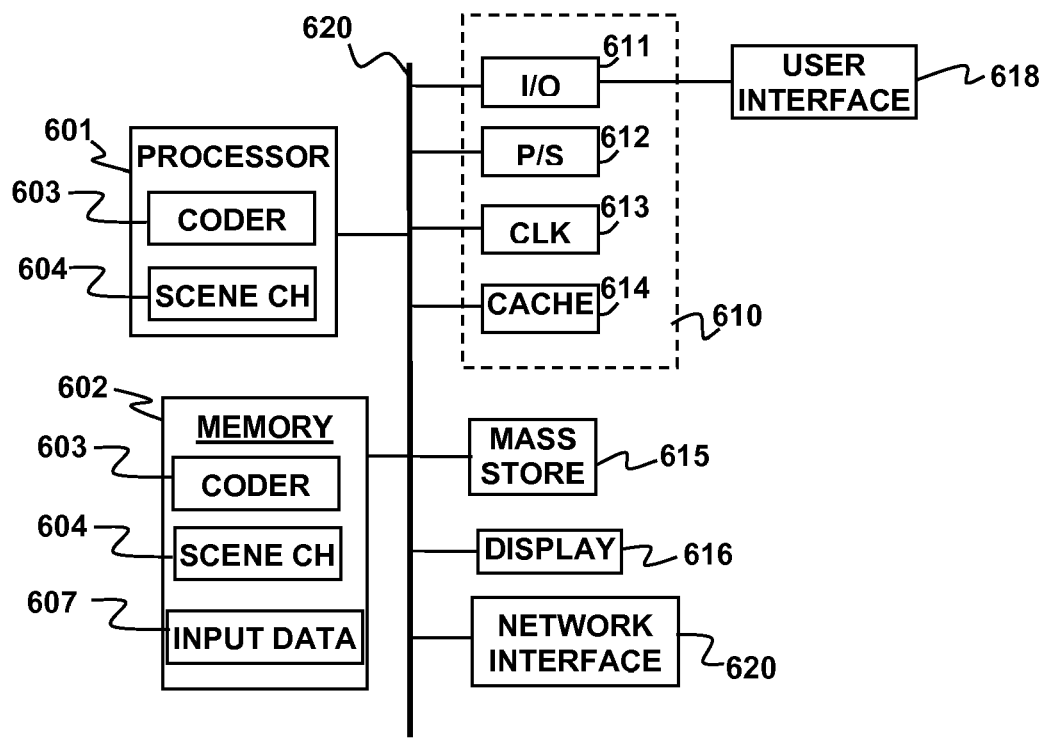
FIG. 6 is a block diagram illustrating an apparatus for implementing scene change detection in video pictures according to an embodiment of the present invention.

The algorithm described above may be implemented on a suitable computer apparatus. FIG. 6 illustrates a block diagram of an example of a computer apparatus 600 that may be used to implement scene-change detection for picture encoding as described above. The apparatus 600 may include generally a processor module 601 and a memory 602. The processor module 601 may include one or more processor cores. As an example of a processing system that uses multiple processor modules, is a Cell processor, examples of which are described in detail, e.g., in Cell Broadband Engine Architecture, which is available online at http://www-306.ibm.com/chips/techlib/techlib.nsf/techdocs/1AEEE1270EA2776387257060006E61BA/$file/CBEA_01_pub.pdf, which is incorporated herein by reference.

The memory 602 may be in the form of an integrated circuit, e.g., RAM, DRAM, ROM, and the like). The memory may also be a main memory that is accessible by all of the processor module 601. In some embodiments, the processor module 601 may include multiple processor cores and local memories associated with each core. A coder program 603 may be stored in the main memory 602 in the form of processor readable instructions that can be executed on the processor module 601. The coder program 603 may be configured to encode a picture into compressed signal data and/or to decode compressed signal data. By way of example, and not by way of limitation, the coder program 603 may be configured as described in commonly-assigned co-pending patent application publication number 20090010338, the contents of which are incorporated herein by reference in their entirety. The coder program 603 may be configured to receive information on whether a given picture is a scene-change picture or not and encode the picture as an I-frame, P-frame, or B-frame based partly on whether the current picture is a scene change picture or not, as discussed above.

A scene-change detection program 604 may also be stored in the memory 602. The scene-change detection program may include instructions that, when executed by the processor module 601 implements scene change detection as described above, e.g., according to the algorithm 200 of FIG. 2A. The coder program 603 and scene-change detection program 604 may be written in any suitable processor readable language, e.g., e.g., C, C++, JAVA, Assembly, MATLAB, FORTRAN and a number of other languages.

Input data 607 may be stored in the memory 602. Such input data may include buffered portions of a streaming data, e.g., encoded video pictures or portions thereof. During execution of the coder program 603 and/or scene change detection program 604, portions of program code and/or data 607 may be loaded into the memory 602 or the local stores of processor cores for parallel processing by multiple processor cores. By way of example, and not by way of limitation, the input data 607 may include video pictures, or sections thereof, before encoding or at intermediate stages of encoding. These various sections may be stored in one or more buffers. In particular, sections may be stored in an output picture buffer implemented in the memory 602.

The apparatus 600 may also include well-known support functions 610, such as input/output (I/O) elements 611, power supplies (P/S) 612, a clock (CLK) 613 and cache 614. The apparatus 600 may optionally include a mass storage device 615 such as a disk drive, CD-ROM drive, tape drive, or the like to store programs and/or data. The device 600 may also optionally include a display unit 616 and user interface unit 618 to facilitate interaction between the apparatus 600 and a user. The display unit 616 may be in the form of a cathode ray tube (CRT) or flat panel screen that displays text, numerals, graphical symbols or images. The user interface 618 may include a keyboard, mouse, joystick, light pen or other device that may be used in conjunction with a graphical user interface (GUI). The apparatus 600 may also include a network interface 620 to enable the device to communicate with other devices over a network, such as the internet. These components may be implemented in hardware, software or firmware or some combination of two or more of these.

There are a number of additional ways to streamline parallel processing with multiple processors in the apparatus 600. For example, it is possible to "unroll" processing loops, e.g., by replicating code on two or more processor cores and having each processor core implement the code to process a different piece of data. Such an implementation may avoid a latency associated with setting up the loop.

Figure 7:
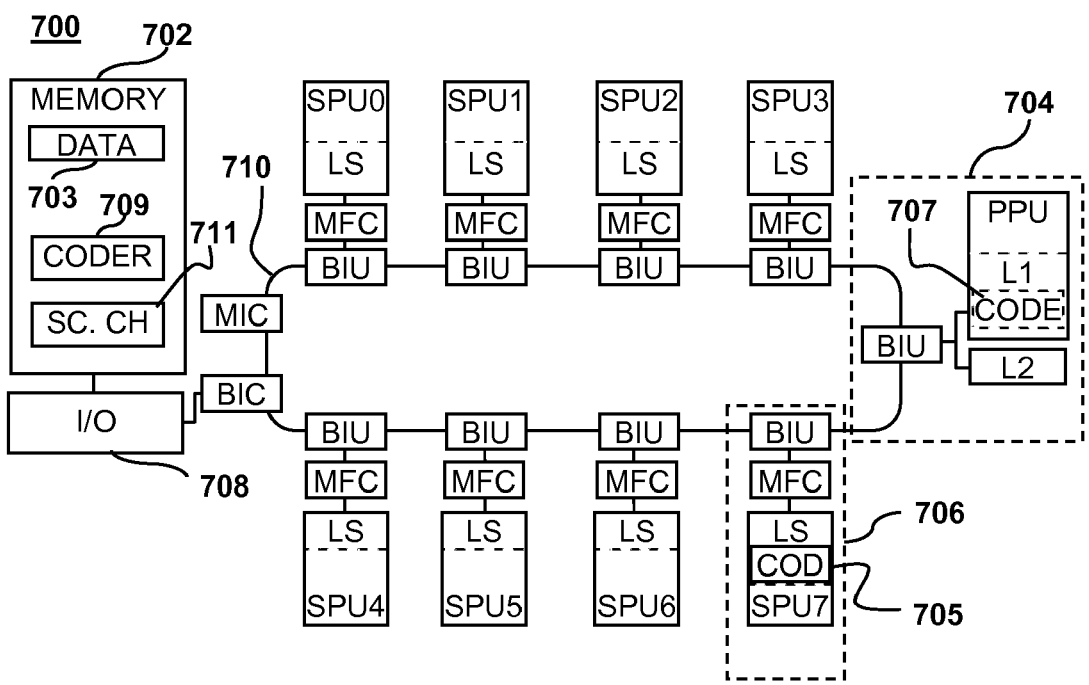
FIG. 7 is a block diagram illustrating an example of a cell processor implementation of an apparatus for encoding implementing scene change detection in video pictures according to an embodiment of the present invention.

One example, among others of a processing system capable of implementing parallel processing on three or more processors is a cell processor. There are a number of different processor architectures that may be categorized as cell processors. By way of example, and without limitation, FIG. 7 illustrates a type of cell processor 700. The cell processor 700 includes a main memory 702, a single power processor element (PPE) 704 and eight synergistic processor elements (SPE) 706. Alternatively, the cell processor 700 may be configured with any number of SPE's. With respect to FIG. 7, the memory 702, PPE 704, and SPEs 706 can communicate with each other and with an I/O device 708 over a ring-type element interconnect bus 710. The memory 702 may contain input data 703 having features in common with the input data 607 described above, a coder program 709 having features in common with the coder program 603 described above, and a scene-change detection program 711 having features in common with the scene-change detection program 604 described above. At least one of the SPE 706 may include in its local store (LS) scene-change detection instructions 705 and/or a portion of the buffered input data that is to be processed in parallel, e.g., as described above. The PPE may include in its L1 cache, code instructions 707 having features in common with the coder program 603 described above. Instructions 705 and data 707 may also be stored in memory 702 for access by the SPE and PPE when needed.

By way of example the PPE 704 may be 64-bit PowerPC Processor Unit (PPU) with associated caches. The PPE 704 may include an optional vector multimedia extension unit. Each SPE 706 includes a synergistic processor unit (SPU) and a local store (LS). In some implementations, the local store may have a capacity of e.g., about 256 kilobytes of memory for code and data. The SPUs are less complex computational units than PPU, in that they typically do not perform any system management functions. The SPUs may have a single instruction, multiple data (SIMD) capability and typically process data and initiate any required data transfers (subject to access properties set up by a PPE) in order to perform their allocated tasks. The SPUs allow the system 700 to implement applications that require a higher computational unit density and can effectively use the provided instruction set. A significant number of SPUs 705 in a system, managed by the PPE 704, allows for cost-effective processing over a wide range of applications. By way of example, the cell processor 700 may be characterized by an architecture known as Cell Broadband engine architecture (CBEA). In CBEA-compliant architecture, multiple Peps may be combined into a PPE group and multiple SPEs may be combined into an SPE group. For the purposes of example, the cell processor 700 is depicted as having only a single SPE group and a single PPE group with a single SPE and a single PPE. Alternatively, a cell processor can include multiple groups of power processor elements (PPE groups) and multiple groups of synergistic processor elements (SPE groups). CBEA-compliant processors are described in detail, e.g., in Cell Broadband Engine Architecture, which is available online at: http://www-306.ibm.com/chips/techlib/techlib.nsf/techdocs/1AEEE1270EA2776387257060006E61BA/$file/CBEA_01_pub.pdf, which is incorporated herein by reference.

Embodiments of the invention provide systems and methods for parallel scene-change detection and encoding of streaming data, such as streaming video. Such embodiments may be applied to most video encoders, in particular, H.264/AVC decoders and, more particularly, to products that have video decoder as a module. Examples of such products include but are not limited to video game consoles, DVD players, software (PC) video decoder/player, video on cell phones, and the like. In alternative embodiments, such systems and methods may be applied to decoding of streaming data other than video.

Examples of such embodiments include systems and methods for decoding streaming audio data, graphic rendering streams, still picture and XML documents. Embodiments of the present invention may be desirable for various applications recording a video game, streaming game images to a portable game device and uploading and sharing game results with multiple game systems connected via a network.

As noted above, embodiments of the invention may be implemented by modifying existing video coding standards to allow for scene change detection prior to compression and encoding of a given picture in a series of video pictures. Although examples have been described above in terms of scene change detection in encoding video images, one may alternatively utilize embodiments of the present invention for encoding still pictures, e.g., in JPEG.

Figure 8:
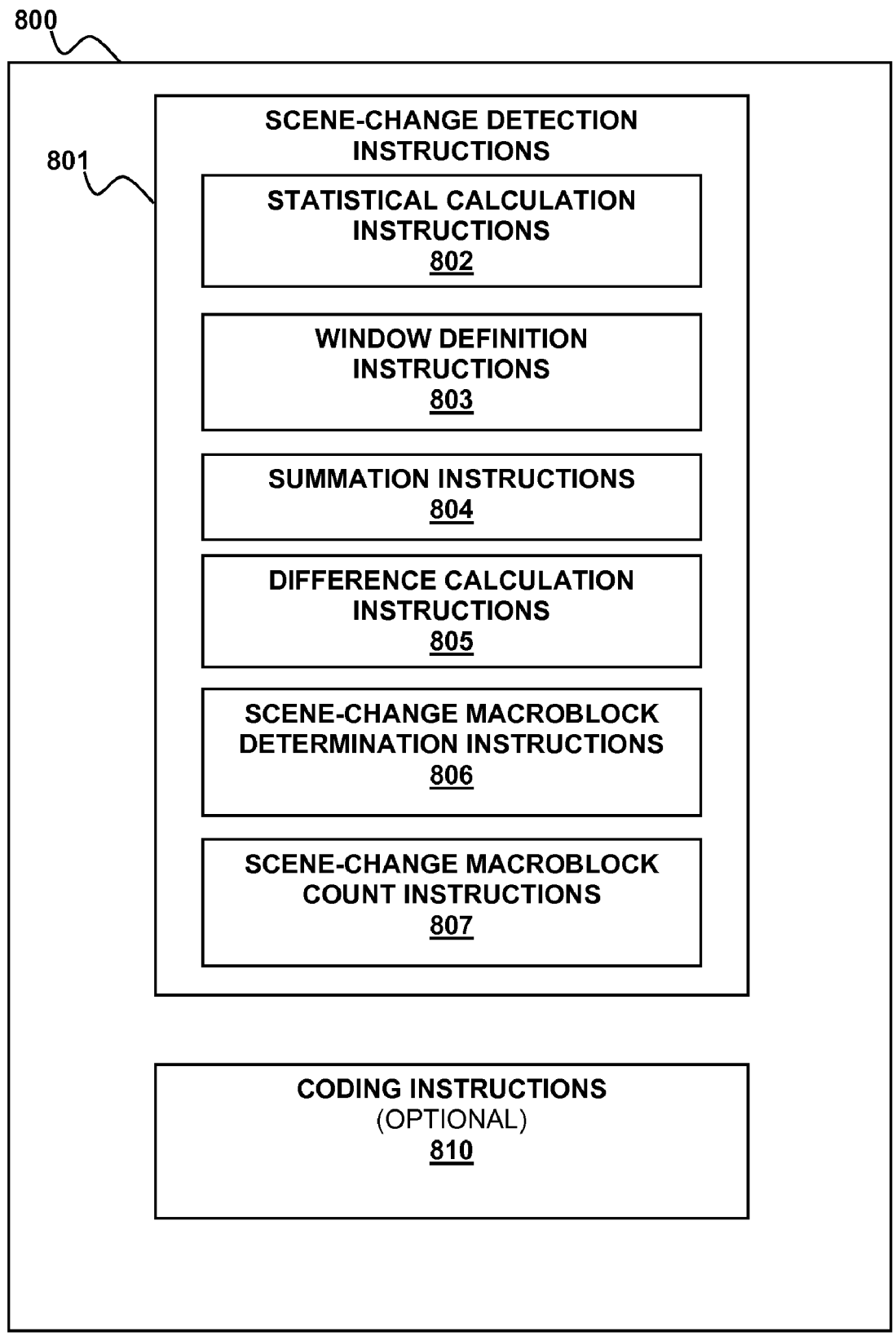
FIG. 8 is a block diagram of a computer readable medium containing computer readable instructions for implementing picture level rate control in accordance with an embodiment of the present invention.

According to another embodiment, instructions for carrying out scene change detection in conjunction with image encoding as described above may be stored in a computer readable storage medium. By way of example, and not by way of limitation, FIG. 8 illustrates an example of a computer-readable storage medium 800. The storage medium contains computer-readable instructions stored in a format that can be retrieved interpreted by a computer processing device. By way of example, and not by way of limitation, the computer-readable storage medium 800 may be a computer-readable memory, such as random access memory (RAM) or read only memory (ROM), a computer readable storage disk for a fixed disk drive (e.g., a hard disk drive), or a removable disk drive. In addition, the computer-readable storage medium 800 may be a flash memory device, a computer-readable tape, a CD-ROM, a DVD-ROM, a Blu-ray, HD-DVD, UMD, or other optical storage medium.

The storage medium 800 contains scene-change detection instructions 801 configured to implement scene change detection upon execution by a processor. The scene-change detection instructions 801 may include one or more statistical calculation instructions 802 that implement calculation of statistical quantities $\mu_m$ for each macroblock in a current picture. In addition the scene-change detection instructions may include one or more window definition instructions 803 that are configured to define a window around a co-located macroblock in a previous picture. Furthermore, the scene-change detection instructions 801 may include one or more statistical summation instructions 804 that calculate a statistical sum E over the macroblocks in the window. In addition, the scene-change detection instructions 801 may include one or more difference calculation instructions 805 configured to calculate a difference between E and $\mu_m$ for a given macroblock in the current picture. The scene-change detection instructions 801 may also include scene-change macroblock determination instructions 806 that use the difference between E and $\mu_m$ to determine whether the given macroblock is a scene-change macroblock. The scene-change detection instructions 801 may also include scene-change macroblock count instructions 807 that use a number of scene-change macroblocks for the current picture to determine whether the current picture is a scene-change picture.

The storage medium 800 may optionally include one or more picture encoding instructions 810 configured to encode the current picture as an I-frame, IDR-frame, P-frame, or B-frame based partly on whether the current picture is determined to be a scene change picture.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for detecting a scene change in encoding one or more digital pictures, comprising:
    a) calculating a statistical quantity for a given section in a current picture;
    b) defining a window of one or more sections around a co-located section in a previous picture;

c) calculating a statistical sum over the one or more sections in the window;
d) calculating a difference between the statistical sum and the statistical quantity for the given section;
e) using the difference between the statistical sum and the statistical quantity for the given section to determine whether the given section is a scene-change section;
f) determining a number of scene-change sections for the current picture;
g) determining whether the current picture is a scene-change picture from the number of scene change sections; and
h) storing or transferring information indicating whether or not the current picture is a scene-change picture,
wherein c) includes determining a weight for each section in the window, wherein the statistical sum is a weighted sum given by a sum of products, wherein each product in the statistical sum is a product of a weight and a corresponding statistical value for a given section of the one or more sections, wherein the statistical sum is taken over all sections in the window.

2. The method of claim 1, further comprising:
i) encoding the current picture with an encoder according to the information indicating whether or not the current picture is a scene-change picture.

3. The method of claim 2, wherein i) includes encoding the current picture as an I-frame if the information indicates that the current picture is a scene-change picture or encoding the current picture as a B-frame or P-frame if the information indicates that the current picture is not a scene-change picture.

4. The method of claim 1, further comprising, repeating a) through e) for a plurality of sections in the current picture.

5. The method of claim 1, wherein each section is a macroblock.

6. The method of claim 1, wherein a) includes calculating a mean pixel value or a variance of a pixel value for each section in the current picture.

7. The method of claim 1, wherein the window includes one or more sections neighboring the co-located section.

8. The method of claim 1, wherein determining the weight for each section in the window includes determining a movement direction and assigning each weight according to a proximity of the corresponding section in the window to the movement direction.

9. The method of claim 1, wherein e) includes comparing the difference between the statistical sum and the statistical quantity to a threshold value.

10. The method of claim 1, wherein g) includes comparing the number of scene change sections to a threshold.

11. The method of claim 1, wherein g) includes determining whether the number of scene-change sections is a majority of sections in the current picture.

12. A system for detecting a scene change in encoding one or more digital pictures, comprising:
a processor;
a memory coupled to the processor;
instructions embodied in the memory and executable by the processor, wherein the instructions are configured to implement a method for detecting a scene change in encoding the one or more digital pictures, the method comprising:
a) calculating a statistical quantity for a given section in a current picture;
b) defining a window of one or more sections around a co-located section in a previous picture;
c) calculating a statistical sum over the one or more sections in the window;
d) calculating a difference between the statistical sum and the statistical quantity for the given section;
e) using the difference between the statistical sum and the statistical quantity for the given section to determine whether the given section is a scene-change section;
f) determining a number of scene-change sections for the current picture;
g) determining whether the current picture is a scene-change picture from the number of scene change sections; and
h) storing or transferring information indicating whether or not the current picture is a scene-change picture,
wherein c) includes determining a weight for each section in the window, wherein the statistical sum is a weighted sum given by a sum of products, wherein each product in the statistical sum is a product of a weight and a corresponding statistical value for a given section of the one or more sections, wherein the statistical sum is taken over all sections in the window.

13. The system of claim 12, further comprising an encoder configured to encode the current picture according to the information indicating whether or not the current picture is a scene-change picture.

14. The system of claim 12, wherein the instructions are further configured to repeat a) through e) for a plurality of sections in the current picture.

15. The system of claim 12, wherein determining the weight for each section in the window includes determining a movement direction and assigning each weight according to a proximity of the corresponding section in the window to the movement direction.

16. The system of claim 13, wherein the encoder is configured to encode the current picture as an I-frame if the information indicates that the current picture is a scene-change picture or encoding the current picture as a B-frame or P-frame if the information indicates that the current picture is not a scene-change picture.

17. A non-transitory computer-readable storage medium having computer program instructions embodied therein, wherein the computer program instructions are configured, when executed, to implement a method for detecting a scene change in encoding one or more digital pictures, the method comprising:
a) calculating a statistical quantity for a given section in a current picture;
b) defining a window of one or more sections around a co-located section in a previous picture;
c) calculating a statistical sum over the one or more sections in the window;
d) calculating a difference between the statistical sum and the statistical quantity for the given section;
e) using the difference between the statistical sum and the statistical quantity for the given section to determine whether the given section is a scene-change section;
f) determining a number of scene-change sections for the current picture;
g) determining whether the current picture is a scene-change picture from the number of scene change sections; and
h) storing or transferring information indicating whether or not the current picture is a scene-change picture,
wherein c) includes determining a weight for each section in the window, wherein the statistical sum is a weighted sum given by a sum of products, wherein each product in the statistical sum is a product of a weight and a corresponding statistical value for a given section of the one or more sections, wherein the statistical sum is taken over all sections in the window.

18. The non-transitory computer-readable storage medium of claim 17, wherein the computer program instructions are further configured to encode the current picture according to the information indicating whether or not the current picture is a scene-change picture.

* * * * *